TIME-SHARING COMPUTER

Filed Jan. 14, 1957

3 Sheets-Sheet 1

INVENTOR
DALE M. JAHN
BY R. V. Craddock
ATTORNEY

Feb. 13, 1962 D. M. JAHN 3,021,067

TIME-SHARING COMPUTER

Filed Jan. 14, 1957 3 Sheets-Sheet 2

INVENTOR
DALE M. JAHN
BY [signature]
ATTORNEY

INVENTOR
DALE M. JAHN
BY L. V. Craddock
ATTORNEY

United States Patent Office 3,021,067

Patented Feb. 13, 1962

3,021,067

TIME-SHARING COMPUTER

Dale M. Jahn, Garden City, N.Y., assignor to Sperry Rand Corporation, a corporation of Delaware Filed Jan. 14, 1957, Ser. No. 634,120

9 Claims. (Cl. 235—164)

Figure 1:
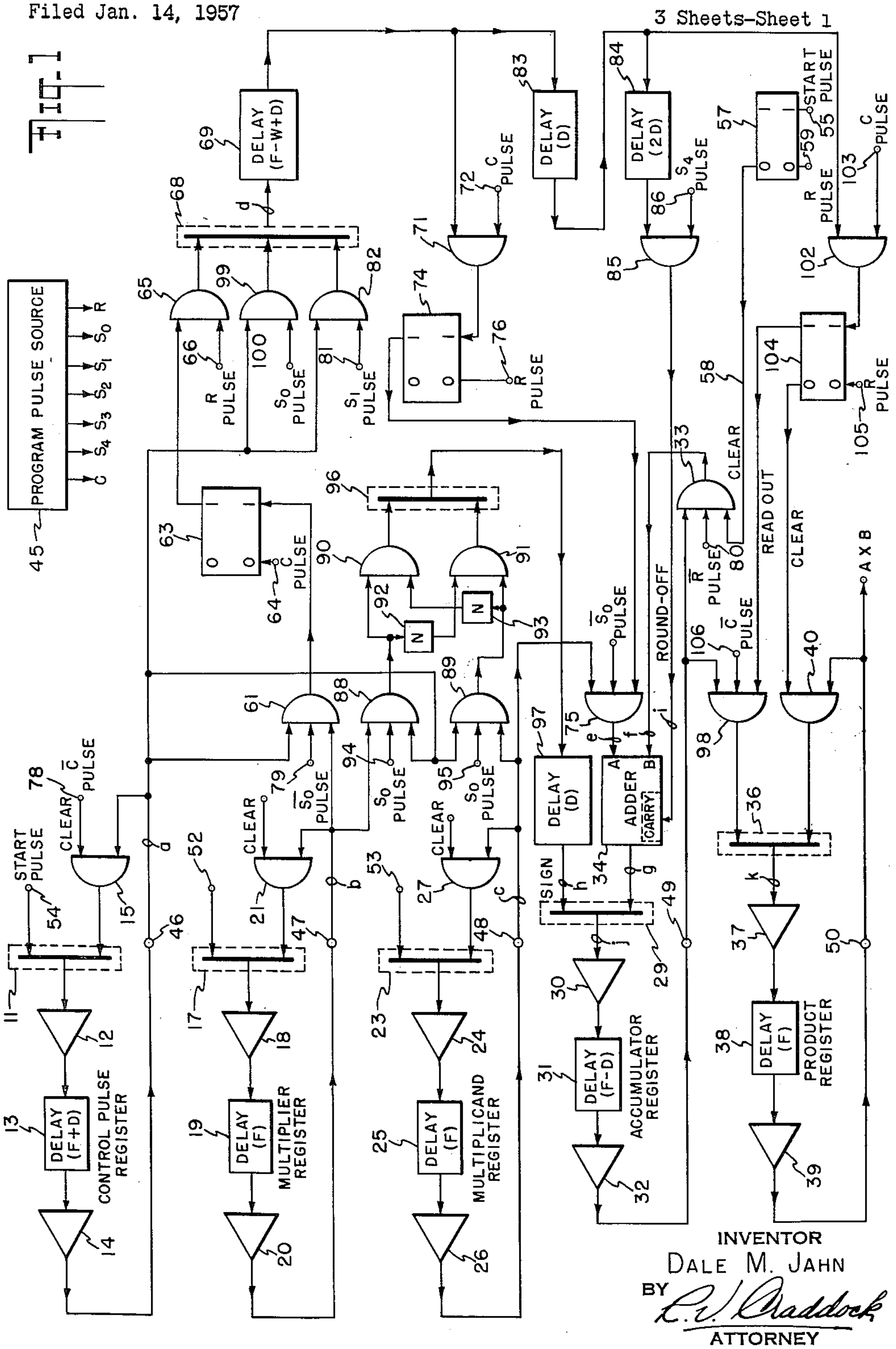

This invention relates to a binary digital computer and more particularly to a computer for multiplying each of a first plurality of binary digital numbers by a corresponding number of a second but equal plurality of binary digital numbers.

In certain data transmission and data processing systems wherein similar information is received from many sources, a particular arithmetic operation must be performed on each set of incoming data. For example, a pair of signal trains representing two digital numbers may be received at random times from each source of information and a similar arithmetic operation, such as multiplication, performed on the two numbers of each pair of signal trains. Rather than having a separate multiplier for each pair of signal trains, it is more economical to use but one multiplier, and by employing time-sharing techniques to perform all necessary multiplications in the single multiplier.

In prior art devices for performing an arithmetic operation on a plurality of incoming signal sets, each set representing the data on which the arithmetic operation was to be performed, the incoming signal sets were stored in a central store. Programming circuits then read the signal sets from the central store in a predetermined sequence and transferred them to a computing circuit which in turn performed the desired arithmetic operation, such as multiplication, on each set. After the operation was completed, the signals representing the answer were transferred to the central store for transmission to a utilization device.

However, the above-described prior art technique had certain disadvantages. Foremost among the limitations was the unpredictable and variable time delay between the time of receipt of a particular signal set by the central store and the time when the answer to the problem became available in the central store. This variable time delay was due to the variable interval between the aforementioned time of receipt of the signal set and the time when the signal set was transferred into the computing circuit. Thus, if the time to perform the complete arithmetic operation on a set of data were represented by $t$ and the number of sources of data were represented by $n$, the total time delay between reception of data by the central store and completion of the corresponding answer would lie in the approximate range of values of $t$ to $nt$. The actual time delay would depend on the position in the sequence of selection of the programming circuit at which the signal set was first delivered to the central store. For example, the incoming data might be the next set in sequence to be transferred to the computing circuit, in which event the time delay for an answer would be approximately $t$, or the programming circuit might at that moment of arrival of the data be selecting the next sequential set of data, in which event the time delay for an answer would be approximately $nt$.

Another limitation of the above-described prior art time-sharing technique is the unnecessary time delay in the total time required to perform each arithmetic operation owing to the access time associated with transferring each set of data from central storage to the computing circuit, and with transferring the corresponding answers from the computing circuit to central storage. Access time is the time interval required to communicate with a storage circuit. Many storage units are of the circulating register type in which the digit signals of the stored number are available only cyclically at a read head or a read terminal. When a particular number is the one next in sequence to be transferred to the computing circuit from central storage, a signal representing a digit in the middle of the number may be the one currently available at the storage unit read head. Thus, a number cannot be read from a storage unit until the proper digit signal in the number sequence is available at the read terminal. Similarly, when the answer is completed in the computing circuit, it cannot always be transferred immediately into the central store. Consequently, access time will vary for each problem. Furthermore, access time will increase the randomness of the time delay between the receipt of a data set and the delivery of the corresponding answer.

It has become desirable, therefore, to provide a time-sharing computing device for performing a particular arithmetic operation on a plurality of sets of input data wherein the time delay between receipt of each data set and delivery of the corresponding answer is substantially constant. Furthermore, it is desirable to provide a time-sharing computing device in which the aforementioned access times are decreased or eliminated.

It is therefore the principal object of this invention to provide an improved computer for performing an arithmetic operation on a plurality of data sets.

Another object of this invention is to provide an improved computer for performing the operation of multiplication on a plurality of sets of multiplicands and multipliers.

Another object of this invention is to provide a time-sharing computing device having a substantially constant time delay between receipt of each set of data and delivery of the corresponding answer.

Another object of this invention is to provide a time-sharing computing device having negligible access time delays.

The foregoing objects are achieved by providing a novel computing circuit in which the input data sets are stored in sequence within the registers of the computing circuit. The computing circuit is adapted to sequentially perform but a single step in the arithmetic operation on each data set in each cycle of its operation, and to store in a register in corresponding sequence the accumulated partial answers as the computation proceeds. In this manner, the computer is simultaneously solving all of the problems which have been received from the associated data sources, but is not necessarily performing corresponding steps in each problem during a given cycle of operation. As an answer is completed, it is transferred to an answer register where it becomes available for immediate use. The answers to all input problems are ultimately stored in sequential manner in the answer register. As a new problem is inserted into its sequential position in the computer register, the old answers are deleted from their sequential positions in the partial answer register. Thus, the complete arithmetic operation is not performed in sequence for each set of data as in prior art devices, but instead single steps are performed in sequence for each data set. In this manner, the operation on each data set is initiated within a relatively short time after it is received by the computer. The total time delay between receipt of each data set and delivery of the corresponding answer is substantially constant, and access times are eliminated within the computer.

Figure 2A:
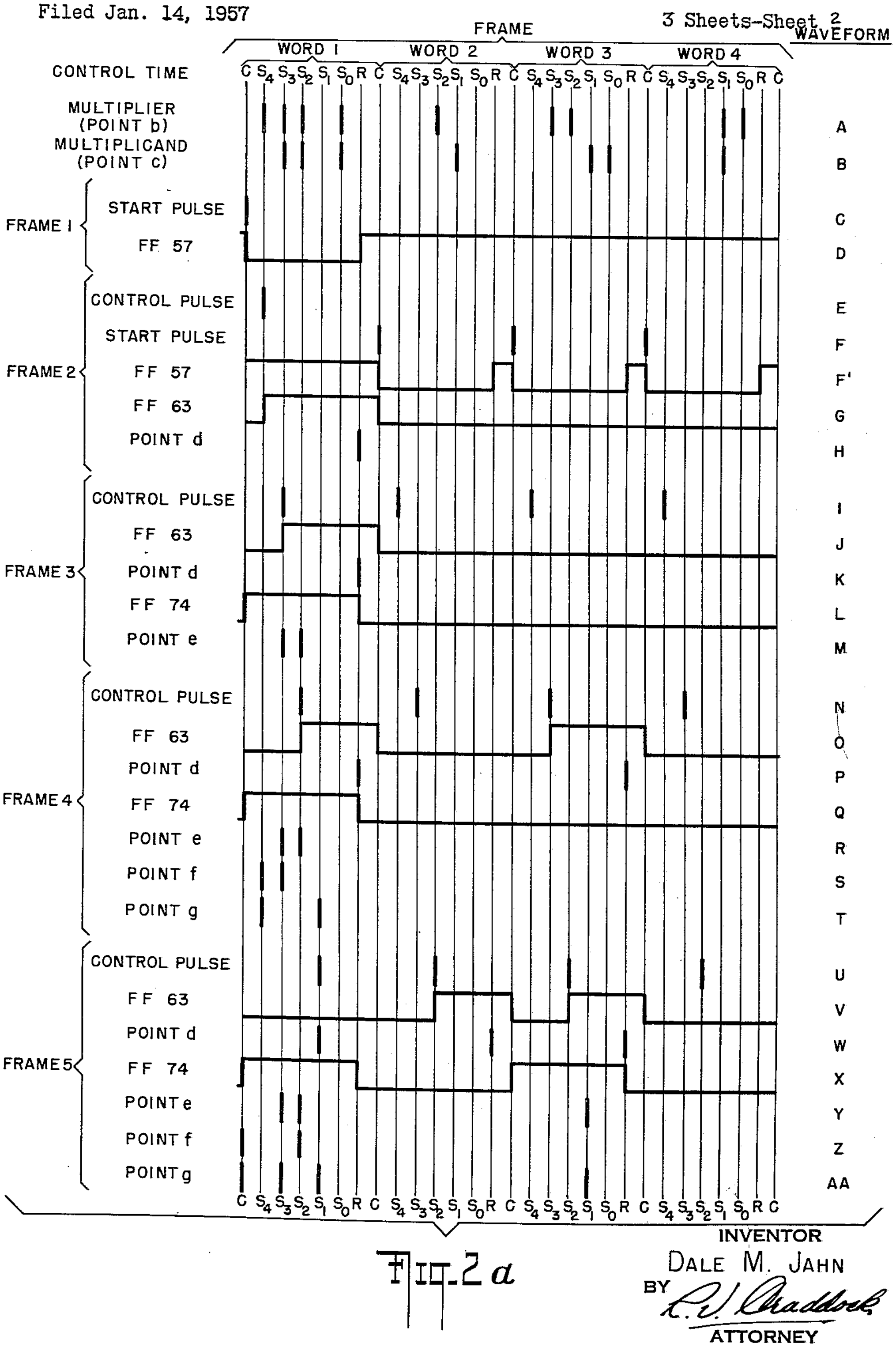
Figure 2B:
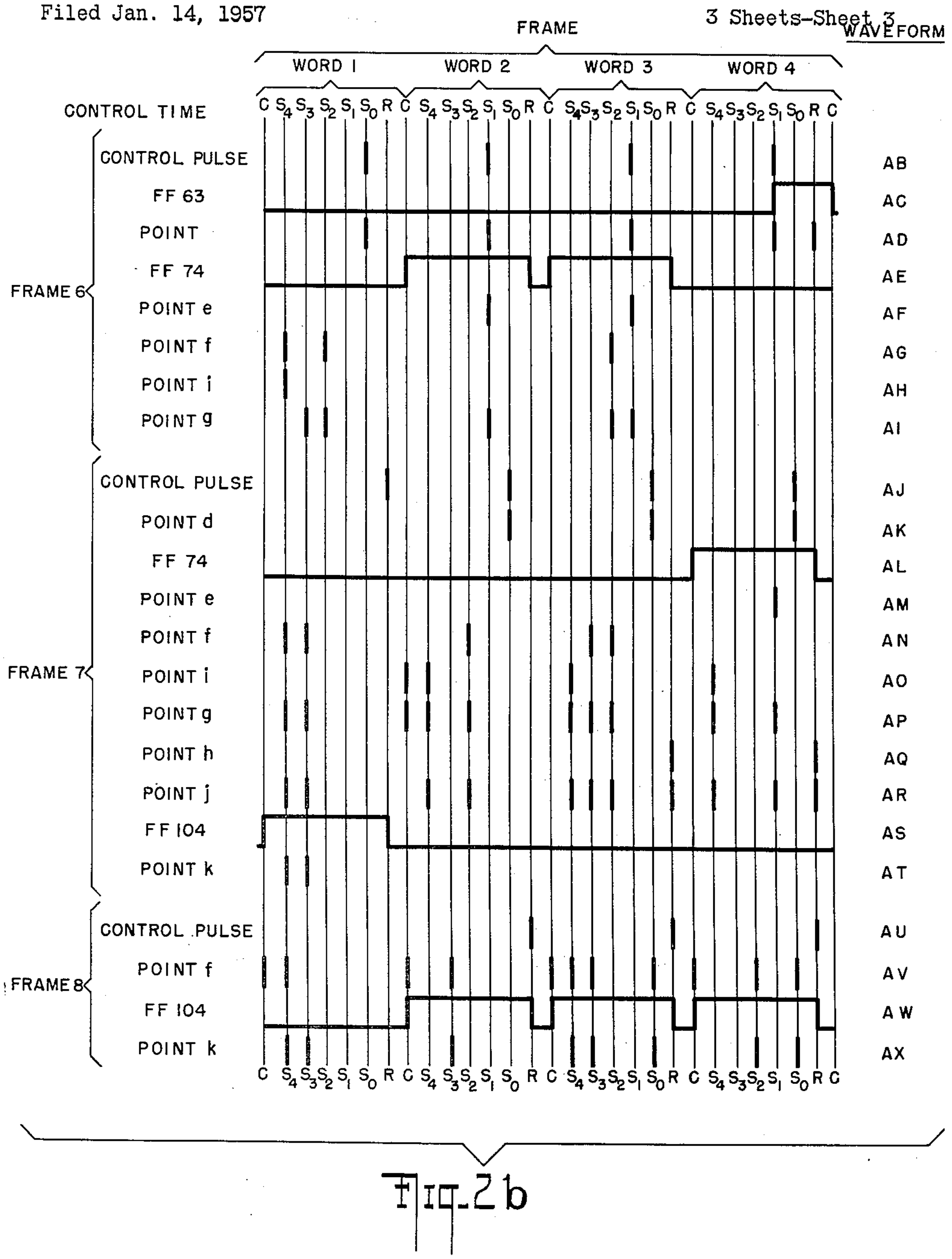

The invention will be described with reference to the accompanying drawings, wherein FIG. 1 is a block diagram of the circuit of the preferred embodiment of this invention, and FIGS. 2*a* and 2*b* represent waveforms and timing sequences within the circuit of FIG. 1.

In the following description and claims certain logical operations and terms which are peculiarly applicable to binary digital computers may be defined as follows:

AND—yields a 1 out if all the inputs are 1. This operation is performed by an AND-gate.

OR—yields a 1 out if any input is 1. This operation is performed by an OR-gate.

NOT—yields the opposite digit or number of the digit input. The NOT logical element operates on a single bit of a binary digital number. Thus if the input to a NOT logical element is 1 the output is 0 and vice versa.

Circulating Register—a register consisting of means for delaying information and means for reinserting the information into the delaying means. Thus the circulating register is a type of dynamic storage device.

The multiplier of FIG. 1 contains five circulating registers and interconnecting circuitry for performing the time-sharing multiplication operation according to the principles of this invention. These five circulating registers are named for purposes of identification Control Pulse Register, Multiplier Register, Multiplicand Register, Accumulator Register and Product Register. The Control Pulse Register comprises the cascade-connected OR-gate 11, amplifier 12, delay element 13, amplifier 14, and AND-gate 15. The Multiplier Register comprises the cascade-connected OR-gate 17, amplifier 18, delay element 19, amplifier 20 and AND-gate 21. The Multiplicand Register comprises the cascade-connected OR-gate 23, amplifier 24, delay element 25, amplifier 26 and AND-gate 27. The Accumulator Register comprises the cascade-connected OR-gate 29, amplifier 30, delay element 31, amplifier 32, AND-gate 33 and adder 34. The Product Register comprises the cascade-connected OR-gate 36, amplifier 37, delay element 38, amplifier 39 and AND-gate 40. Signals introduced into each register circulate through the elements thereof in the order of connection indicated. Corresponding multipliers, multiplicands, accumulated partial products and products are stored in the same sequence in their corresponding registers. Control pulses circulating in the Control Pulse Register control all AND-gates in the computer with the exception of AND-gates 21, 27 and 33.

The operation of the embodiment of FIG. 1 will be described with reference to the waveform and timing diagram of FIGS. 2*a* and 2*b*. For purposes of illustration it will be assumed that the input data sets represent binary digital numbers less than unity. However this invention is not limited to the multiplication of numbers less than unity but may be employed for computation of digital numbers of any order of magnitude. Different numbers will be shown for each input data set to further clarify the ensuing description. Furthermore, operation will be shown wherein the individual computations are not initiated during the same cycle of the computer so that during each cycle different steps in the multiplication process will be taking place for the different data sets. By way of example, FIG. 1 will be assumed to solve problems from four independent sources of data, although the prototype device as built actually handles sixty-four sources of information. Numbers will be represented as an absolute magnitude and sign. It will be further assumed that there are but four significant digits in the magnitude of each number, although numbers in the prototype device have thirteen significant digits. The four binary digital number sets assumed to be delivered to the computer from the respective four independent sources of data and their corresponding products and decimal system equivalents are as follows:

| Data Set 1 | Data Set 2 | Data Set 3 | Data Set 4 |
|---|---|---|---|
| (−)0110=6/16 | (+)1000=2/4 | (−)1000=4/8 | (+)1000=1/2 |
| ×(−)0111=7/16 | ×(+)0100=1/4 | ×(+)0110=3/8 | ×(−)1000=1/2 |
| (+)0011≐3/16 | (+)0010=1/8 | (−)0011=3/16 | (−)0100=1/4 |

The four digits shown in each of the multiplicands, multipliers and products in the above illustrations represent respectively the numerical orders $2^{-1}$, $2^{-2}$, $2^{-3}$, $2^{-4}$ in sequence from left to right.

A sequential timing diagram entitled "Control Time" for the computer is shown in the first line of FIG. 2. This sequential timing diagram indicates the order in which program pulses are produced on separate leads of a program pulse seource 45. In this embodiment the program pulse source 45 produces seven uniformly spaced sequential pulses, designated in order of occurrence C, $S_4$, $S_3$, $S_2$, $S_1$, $S_0$, R. This set of seven pulses occurs repetitively. The spacing between an R-pulse and the next occurring C-pulse is the same as that between the individual pulses of the set. Each set of pulses starting with the C-pulse and ending with the R-pulse is designated a word. Four sequential words constitute a frame or group, the frame thus representing the time taken for the delivery of twenty-eight consecutive pulses at the output leads of program pulse source 45. In the prototype computer a frame comprises 64 words to correspond to the 64 data sources. The program pulses control the logic and sequential operation of the computer.

Provision is made to store twenty-eight bits of data, each bit representing a time corresponding to that of one program pulse, in both the Multiplier Register and the Multiplicand Register. The time of a program pulse is the time from the beginning of one program pulse to the beginning of the next occurring program pulse. Signals representing the four significant digits of each of the four numbers are stored sequentially in the Multiplier Register and Multiplicand Register and are spaced from each other by time intervals corresponding to the program pulse interval. Each word thus requires seven bit intervals, four for the four significant digits, one for the sign digit and two for spaces.

The signals circulating in each register are in the delay element of that register for the predominant percentage of time. The register terminals 46, 47, 48, 49 and 50 of the respective registers may be considered to be the read terminals because it is at these terminals that a circulating signal is available to be read. The time at which a signal appears at a read terminal is designated according to the terminal of program pulse source 45 at which a pulse is being delivered. For example, if a digit signal appears at terminal 47 when pulse source 45 was delivering an R-pulse, the *p* digit signal would be said to be read from the Multiplier Register at R-time. A signal inserted in the upper input leads of respective OR-gates 17 and 23 will bear the same time designation as when it later appears at respective read terminals 47 and 48, because the delay of delay elements 19 and 25 is equal to one frame.

Signals representing the digits of both the multiplier and multiplicand are delivered to the respective upper terminals of the OR-gates 17 and 23 of the Multiplier Register and the Multiplicand Register at $S_4$-time, $S_3$-time, $S_2$-time and $S_1$-time. Thus, it might be said that the multipliers are written into write terminal 52 of the Multiplier Register during $S_4$ to $S_1$-time and, correspondingly, the multiplicands are written into the write terminal 53 of the Multiplicand Register during $S_4$ to $S_1$-time. A signal representing the algebraic sign of the number is written into the respective registers at $S_0$ time. In the instant embodiment, a unity digit represents a negative sign and a zero digit represents a positive sign.

Assuming, now, that the four problems previously set forth have been stored in the Multiplier and Multiplicand Registers, the waveforms at points *b* and *c* are indicated in FIG. 2 by respective waveforms A and B. The signals representing these problems need not have been written into the registers simultaneously, but at any time prior to initiation of the computation on the respective problem. In order to illustrate how this computer may be performing different parts of a problem in each cycle, it will be assumed that computation starts first on data set 1, followed one frame later by the start of computation on data sets 2, 3 and 4.

*Initiation of computation*

Computation on a particular problem is initiated by applying a start pulse to write terminal 54 of the Control Pulse Register and to terminal 55 of a flip-flop 57. For purposes of the following description frames are numbered in sequence starting with the frame in which a start pulse initiates computation on data set 1. A start pulse may be applied to terminals 54 and 55 only at C-time. The particular C-time selected must coincide with the C-pulse occurring at the beginning of the word corresponding to the data set on which it is desired to perform the arithmetic operation of multiplication. Thus, in waveform C a start pulse is applied at C-time of word 1. This initiates operation on data set 1. The start pulse applied to write terminal 54 introduces a circulating control pulse into the control pulse register. The start pulse applied to terminal 55 sets flip-flop 57 to unity. The 0 output terminal of flip-flop 57 (waveform D) is connected by a lead 58 to one input terminal of AND-gate 33. The application of this 0 signal to one input terminal of AND-gate 33 inhibits passage of any signals therethrough and the Accumulator Register is cleared of any stored signals occurring in word 1 time. Flip-flop 57 is reset to its 0 state and in turn opens AND-gate 33 at R-time by the application of an R program pulse from source 45 to terminal 59 of flip-flop 57. Thus, application of a start pulse to the computer initiates a circulating control pulse in the Control Pulse Register and clears the corresponding partial product in the Accumulator Register.

In the example, start pulses are applied in the next succeeding frame (waveform F) to terminals 54 and 55 at the C-times of words 2, 3 and 4 to initiate the arithmetic operations on data sets 2, 3 and 4. It should be pointed out that the application of the start pulse may be independently controllable at the discretion of the operator of the computer or may be synchronized with the incoming data set so that computation is started immediately upon insertion of the corresponding multipliers and multiplicands into the registers.

The time of circulation of signals in the Multiplier and Multiplicand Registers is equal to one frame, indicated at respective delay elements 19 and 25 as a delay of F digits. The time of circulation of signals in the Control Pulse Register is one frame plus one digit, indicated at the delay element 13. Thus the signals stored in the Multiplier and Multiplicand Registers appear at the respective read terminals 47 and 48 at the same times in each cycle of operation of the computer. However, a signal stored in the Control Pulse Register appears at read terminal 46 one digit later in each frame. Therefore, the pulse written into the Control Pulse Register in waveform C appears in the next frame at $S_4$-time, as indicated in waveform E.

The read terminal 46 of the Control Pulse Register is connected to one input terminal of an AND-gate 61. The read terminal 47 of the Multiplier Register is connected to another input terminal of AND-gate 61. An $\overline{S_0}$-pulse is applied to a third terminal 79 of AND-gate 61. The superscribing line over the symbol $S_0$ indicates that the signal represents a NOT of the $S_0$ signal; that is, when program pulse source 45 is producing an $S_0$-pulse a 0 signal is applied to terminal 79 of AND-gate 61 and at all other times a 1 is applied to terminal 79. Thus, terminal 79 acts to inhibit the operation of AND-gate 61 only at $S_0$-time. AND-gate 61 produces an output signal each time the circulating control pulse appears at read terminal 46 if simultaneously the multiplier digit is a 1. In frame 2 the multiplier digit at $S_4$-time of word 1 is unity and the coincidence of the circulating control pulse and the unity digit at $S_4$-time produces an output pulse from AND-gate 61.

The output terminal of AND-gate 61 is connected to the unity input terminal of flip-flop 63. Therefore, a flip-flop 63 is changed to the 1 state upon the coincidence of a circulating pulse at terminal 46 and a unity digit pulse in the Multiplier Register. Flip-flop 63 continues in the 1 state until the next occurring C-time when it is returned to the 0 state by the application of a C-pulse to terminal 64.

The unity output terminal of flip-flop 63 is connected to one input terminal of an AND-gate 65. The R-pulse terminal of pulse source 45 is connected to the other input terminal 66 of AND-gate 65. AND-gate 65 (waveform G) produces an output signal at R-time whenever flip-flop 63 has been activated. Therefore, AND-gate 65 produces a unity digit signal at the R-time next following the coincidence of a circulating control pulse and a unity digit in the multiplier at AND-gate 61.

The output terminal of AND-gate 65 is connected to one input terminal of an OR-gate 68. The output terminal of OR-gate 68 is connected to the input terminal of a delay element 69. In the instant case, in frame 2 AND-gate 65 produces an output signal at R-time due to the coincidence of the circulating control pulse and a unity digit in the multiplier of data set 1 at $S_4$-time of word 1. This is shown in waveform H. The delay time of delay element 69 is equal to one frame minus one word plus one digit, as indicated in FIG. 1. Consequently, a pulse delivered at R-time from AND-gate 65 will be delivered from the output terminal of delay element 69 at C-time of the corresponding word in the next occurring frame.

The next cycle of operation of the computer is indicated in frame 3. Each control pulse appears in waveform I one digit later than its occurrence in frame 2. Once again, during word 1 there is coincidence between the control pulse and a unity digit in the multiplier at time $S_3$ in word 1 and AND-gate 61 delivers an output signal; which is followed by an output signal from AND-gate 65 at the next R-time. This is indicated in waveforms J and K. The control pulses in words 2, 3 and 4 appear at times $S_4$. However, the multipliers of data sets 2, 3 and 4 have no unity digit in $S_4$-time and, consequently, no signal appears from AND-gate 61 during words 2, 3, and 4 of frame 3.

*Multiplication of data set 1*

To simplify the explanation of the operation of this invention, the computation in detail on only data set 1 will be described. At appropriate points the significance of the operation of the entire invention, as it relates to the detailed steps will be indicated.

The pulse of waveform H is delayed and leaves delay element 69 at C-time of word 1 in frame 3. The output terminal of delay element 69 is connected to an input terminal of AND-gate 71. The pulse of waveform H, upon delay, arrives simultaneously at AND-gate 71 with a C-pulse applied to input terminal 72.

The output terminal of AND-gate 71 is connected to the unity input terminal of a flip-flop 74. An output signal from AND-gate 71 sets flip-flop 74 to its unity state, which in turn opens an AND-gate 75 to which flip-flop 74 is connected. Read terminal 48 of the Multiplicand Register is connected to an input terminal of AND-gate 75. The NOT of the $S_0$ pulse is connected to a third input terminal of AND-gate 75 and prevents any output signal from that AND-gate when the $S_0$ pulse occurs. Thus, AND-gate 75 is effectively opened by flip-flop 74 at C-time and closed at the next occurring R-time by an R-pulse applied to the 0 input terminal 76 of flip-flop 74. AND-gate 75 acts to transfer a multiplicand into the Accumulator Register for every digit of the corresponding multiplier which is unity. The output terminal of AND-gate 75 is connected to one input terminal of adder 34. The other input terminal of adder 34 is connected to read terminal 49 of the Accumulator Register through AND-gate 33. Adder 34 serves to add incoming multiplicands from AND-gate 75 to the signals stored in the Accumulator Register.

Thus, as shown in waveform L flip-flop 74 is set into the unity state at C-time of word 1 and continues in the unity state until the next occurring R-time. AND-gate 75 remains open permitting transfer of the multiplicand of set 1 into the Accumulator Register. The entry of the multiplicand into the adder of the Accumulator Register is shown in waveform M taken at point *e*. Until this time, in the particular example, the Accumulator Register has had no signal stored therein. The signal now stored in the Accumulator Register represents the multiplicand of set 1.

In frame 4 the control pulse occurs at $S_2$-time (waveform N), and is again coincident with the multiplier unity digit, and actuates AND-gate 61 to produce a pulse at point *d* at R-time, as shown in waveform P. AND-gate 71 is again actuated in frame 4, thereby setting flip-flop 74 to the unity state (waveform Q) and permitting insertion of another multiplicand of set 1 into the Accumulator Register, as shown in waveform R. The time for circulation of a signal in the Accumulator Register is equal to one frame minus one digit, indicated at delay element 31. Therefore, a number stored in the Accumulator Register shifts toward the left one digit each frame in the timing diagram of waveform Q. Thus, in frame 4 the multiplicand which was stored in the Accumulator Register in frame 3 has shifted to the left one digit, as indicated in waveform S, taken at point *f*. Adder 34 adds the digital numbers represented by the signals at points *e* and *f* and delivers output signal representing the sum at point *g*, as shown in waveform T.

The control pulse continues to circulate in the Control Pulse Register from the time it is initiated at C-time in a particular word until it next occurs at C-time in AND-gate 15, whereupon it is cancelled by a $\overline{C}$-pulse applied to terminal 78. The circulation of the control pulse is shown in successive waveforms C, E, I, N, U, AB, AJ, and AU. A new computation may be started for data set 1 by the insertion of a start pulse in word 1 at any time thereafter. AND-gate 61 serves to sample successive multiplier digits $S_4$, $S_3$, $S_2$ and $S_1$ by the application of the circulating control pulse to its input terminal. However, at $S_0$-time AND-gate 61 is inhibited by the $\overline{S}_0$ pulse applied to terminal 79 and does not pass a multiplier digit.

In frame 6, no multiplicand signal is added to word 1 of the partial product stored in the Accumulator Register, since the $S_1$ digit of the multiplier of data set 1 is 0. It may be noted that the digit occurring at C-time in waveform AA, which represents the accumulated partial product, is not shifted to R-time in frame 6 (waveform AG), but instead is inhibited by AND-gate 33 by an $\overline{R}$ pulse applied to terminal 80.

In the computer as thus far described, the control pulse serves to insert a multiplicand into the Accumulator Register each time a unity digit appears in the multiplier. This can occur four times where four significant digits are employed. Each cycle the Accumulator Register shifts the stored partial product one digit to the left, thereby assuring the correct order of significance for each inserted multiplicand. The signals appearing at C-time in the Accumulator Register represent the lowest order of significance and are inhibited in AND-gate 33 so that they do not shift to R-time.

In frame 6, the last possible multiplicand will have been added to the Accumulator Register in word 1 so that the accumulated partial product as it is read out of the adder is complete and at this time has five significant places from the lowest order digit in C-time to the highest order digit in $S_1$-time. The order of significance of the digits, however, is displaced by one position; that is, the digits at $S_4$-time represent the order $2^{-5}$ and those at $S_1$-time represent the order $2^{-2}$. Following the next circulation through delay element 31 the digits will be in their proper position and may be read out of the Accumulator Register as the proper product to word set 1.

*Round-off*

As has been pointed out above, in the sixth frame following the insertion of a start pulse for a particular data set the digits in the Accumulator Register at $S_4$-time represent the order $2^{-5}$. In the final product it is desired to have only the lowest digital order be $2^{-4}$. Consequently it is necessary in frame 6 to round off the number in the Accumulator Register which will be the time product in frame 7. Round-off is accomplished by applying a digit to the carry input of adder 34 at $S_4$-time. This is equivalent to adding to the number stored in the Accumulator Register a number equal to $1 \times 2^{-5}$. This round off digit is shown in waveform AH taken at point *i*.

The round-off digit is initiated in the preceding frame by the application of an $S_1$-pulse to an input terminal 81 of an AND-gate 82. The other input terminal of AND-gate 82 is connected to read terminal 46 of the Control Pulse Register. Consequently an output pulse is delivered from AND-gate 82 whenever the circulating control pulse reaches $S_1$-time. The output terminal of AND-gate 82 is connected to an input terminal of OR-gate 68. Thus, the initiation of the round-off signal is shown in frame 5 at $S_1$-time of word 1 in waveform W. This signal is delayed in the series-connected delay elements 69, 83 and 84. The total delay time through these three elements is one frame minus one word plus four digits. Thus, the round-off pulse, which was initiated at $S_1$-time, appears at the output of delay element 84 at $S_4$-time in the next frame, but in the same word. The output terminal of delay element 84 is connected to one input terminal of an AND-gate 85. $S_4$-pulses from pulse source 45 are applied to the other input terminal 86 of AND-gate 85. Consequently, in frame 6 a signal appears at the output terminal of AND-gate 85 at $S_4$-time of word 1. The output terminal of AND-gate 85 is connected to the carry input of adder 34 and stores a signal therein equivalent to the digit $1 \times 2^{-5}$. It may be noted that the round-off signal is inserted into the carry input at a time when the lowest order significant digits are applied to adder 34. Thus, there would be no ambiguity within the adder since no carry term is generated within the adder at this moment.

*Product sign*

The digits representing the algebraic signs of the respective multipliers and multiplicands occur at $S_0$-time of the corresponding words. In the instant embodiment a minus sign is indicated by a unity digit and a positive sign by a zero digit at $S_0$-time. Thus, as shown in waveforms A and B the multipliers in words 1 and 4 are negative and the multiplicands in words 1 and 3 are negative. It is now necessary to generate signals representing the signs of the products at $S_0$-time in the answers. The Accumulator Register contains the complete product of a data set in its proper temporal position at $S_4$, $S_3$, $S_2$ and $S_1$-times in the seventh frame after application of a control pulse for the particular data set. It is in this frame that it is desired to have a signal representing the sign of the product in the Accumulator Register at $S_0$-time of the corresponding word.

A logic element for generating this sign requires that when two sign digits of the multiplier and multiplicand are alike and the sign of the result is positive, its output signal represents zero. When the two sign digits are unlike and the sign of the result is negative the output signal of the logic element represents unity. This logic is accomplished in the interconnected AND-gates 88, 89, 90 and 91 and NOT logical elements 92 and 93. The Multiplier Register read terminal 47 is connected to one input terminal of AND-gate 88. The read terminal 48 of the Multiplicand Register is connected to one input terminal of AND-gate 89. The read terminal 46 of the Control Pulse Register is connected in parallel to another input terminal of each of AND-gates 88 and 89. An enabling pulse $S_0$ is applied to respective other input terminals 94 and 95 of AND- gates 88 and 89. Thus, only after a start pulse has been inserted into the Control Pulse Register and circulated to reach $S_0$ time are gates 88 and 89 actuated. At this time a signal appears at the output terminals of the respective AND-gates 88 and 89 if the corresponding multipliers and multiplicands are negative. The output terminal of AND-gate 88 is connected in parallel to the input terminal of NOT logical element 92 and to one input terminal of AND-gate 90. The output terminal of AND-gate 89 is connected in parallel to the input terminal of NOT logical element 93 and to one input terminal of AND-gate 91. The output terminals of NOT logical elements 92 and 93 are connected to the respective other input terminals of AND-gates 91 and 90. The output terminals of AND-gates 90 and 91 are connected to respective input terminal of an OR-gate 96. The output signal at time $S_0$ from OR-gate 96 represents the sign of the product. The output terminal of OR-gate 96 is connected to the input terminal of a one digit delay element 97. The output terminal of delay element 97 is connected to an input terminal of OR-gate 29. The sign signal is inserted into the Accumulator Register in the sixth frame after computation has started. At this time the products are complete in the Accumulator Register, but are shifted one place to the right from their proper digital order. Thus, it is necessary to insert the sign digit one place to the right of its normal digital order and, consequently, delay element 97 serves to insert the sign digit signal into the Accumulator Register at R-time. In frame 7 the stored number and its sign will occupy the proper digital order, the sign appearing at $S_0$ time.

*Product handling*

As has been indicated above the product is complete within the Accumulator Register and in its proper digital orders in the seventh frame following initiation of the start pulse. At this time it must be transferred from the Accumulator Register into the Product Register. This transference is necessary because the Accumulator Register will ultimately destroy the completed product stored therein, since it shifts the product one digital order to the left in the timing diagram for each cycle of circulation and is inhibited at R-time in each cycle. The Product Register contains delay element 38, whose delay is equal to one frame. Thus, once a number is stored in the Product Register it will retain its time relationship indefinitely with respect to the timing sequence of the computer. Transference of the completed product from the Accumulator Register to the Product Register is controlled by a gating or read-out signal applied to one input terminal of an AND-gate 98. Another input terminal of AND-gate 98 is connected to read terminal 49 of the Accumulator Register.

The gating signal is initiated in the preceding sixth frame following the start of computation in an AND-gate 99. An $S_0$ pulse is applied to one input terminal 100 of AND-gate 99. The Control Pulse Register read terminal 46 is connected to the other input terminal of AND-gate 99. An output signal is delivered from AND-gate 99 whenever the circulating control pulse reaches time $S_0$. The output terminal of AND-gate 99 is connected to another input terminal of OR-gate 68. This output signal of OR-gate 68 is shown at $S_0$-time of word 1 in waveform AD. This signal is delayed in delay elements 69 and 83 a total time equal to one frame minus one word plus two digits and subsequently appears at C-time at the output terminal of delay element 83. The output terminal of delay element 83 is connected to one input terminal of an AND-gate 102. The other input terminal 103 of AND-gate 102 is adapted to receive a C-pulse. Thus, an output signal is delivered by AND-gate 102 at C-time of word 1 in the seventh frame following the application of the start pulse to the computer. The output terminal of AND-gate 102 is connected to the unity input terminal of a flip-flop 104. Flip-flop 104 remains in its unity state until the next succeeding R-pulse, which is applied to the zero input terminal 105 of flip-flop 104 (waveform AS).

The unity output terminal of flip-flop 104 is connected to an input terminal of AND-gate 98 and serves to open AND-gate 98 in order that the corresponding stored product from the Accumulator Register may be transferred into the Product Register. The output terminal of AND-gate 98 is connected to one input terminal of OR-gate 36. A $\overline{C}$-pulse applied to a third input terminal of AND-gate 98 inhibits the transference of signals from the Accumulator Register into the Product Register at C-time when AND-gate 98 is open. This is necessary so that signals representing digital order $2^{-5}$ are not transferred into the Product Register. The signal inserted into the Product Register from word 1 is shown in waveform AT.

The final product from all four data sets is shown in waveform AX in frame 8. The time of this waveform is subsequent to completion of all four products. It may be noted that in the examples set forth the particular multiplication steps on words 2, 3 and 4 are simultaneous but lagging by one step those of word 1. Thus, it is seen that this computer can simultaneously perform the operations of multplication on a plurality of data sets by successively performing a single operation on each data set, but that it is not necessary that the same operation on all data sets be performed in a given cycle of operation. Any computation may be started at any time for a given data set, and the computation is completed independently of the times at which the computations of the other data sets are started. There is no wasted access time since all storage of all data sets takes place in the computer registers. The time delay between insertion of a data set and completion of the corresponding product is substantially uniform for all data sets regardless of when they are received by the computer. Thus, in the prototype computer with its 13 significant digit numbers, 17 frames are required between initiation of computation and delivery of the product of a particular data set. The maximum deviation for starting computation is approximately one frame. Therefore, the maximum fractional time deviation between receipt of a data set and delivery of the product is approximately $\frac{1}{17}$.

Although the computation for data sets 2, 3 and 4 has not been set forth in detail, the steps are shown in the timing diagram and may be readily understood with reference to the detailed explanation of the computation on data set 1.

While the invention has been described in its preferred embodiment, it is to be understood that the words which have been used are words of description rather than of limitation and that changes within the purview of the appended claims may be made without departing from the true scope and spirit of the invention in its broader aspects.

What is claimed is:

1. A binary digital computer for multiplying each of $n$ binary digital multiplicands by a corresponding one of $n$ binary digital multipliers, comprising first and second circulating registers each adapted to delay the signals stored therein by a time corresponding to that of $n \times m$ consecutive digits, means for storing in said first register signals representing in sequence said $n$ multiplicands, wherein each multiplicand consists of less than $m$ digits and wherein digits of corresponding order of successive multiplicands are spaced in said first register by a time interval corresponding to $m$ digits, means for storing in said second register signals representing in sequence said $n$ multipliers, wherein each multiplier consists of less than $m$ digits, wherein digits of corresponding order of successive multipliers are spaced in said second register by a time interval corresponding to $m$ digits, and wherein said sequence of $n$ multipliers is the same as the sequence of the $n$ corresponding multiplicands stored in said first register, a third circulating register adapted to delay the signals stored therein by a time differing by one digit from that of $n \times m$ consecutive digits, a first AND-gate having a pair of input terminals and an output terminal, means for connecting one input terminal of said first AND-gate to a read terminal of said third register, means for connecting the other input terminal of said first AND-gate to a read terminal of said second register, control means for applying a control signal representing a unity digit to said third register at a time whereby said control signal arrives at said first AND-gate simultaneously with the arrival at said first AND-gate of a signal representing an extreme order digit of the $i$th multiplier in said second register, wherein said control signal continues to circulate in said third register and to arrive periodically at said first AND-gate simultaneously with digits of succeeding orders of said $i$th multiplier, a second AND-gate having a pair of input terminals and an output terminal, means for connecting one input of said second AND-gate to a read terminal of said first register, a delay gate generating means coupled between the output terminal of said first AND-gate and the other input terminal of said second AND-gate for applying a gating signal to said second AND-gate other input terminal coincident with the first arrival of the first digit signal of the $i$th multiplicand at said second AND-gate following the simultaneous arrival of signals representing unit digits of said $i$th multiplier and said control signal at said first AND-gate, a binary digital adding circuit having a pair of input terminals and an output terminal, said adding circuit being adapted to provide an output signal representing the sum of a pair of binary digital numbers in serial form applied as a pair of input signals to the respective input terminals of said adding circuit, a delay element having an input and an output terminal and adapted to delay signals by a time differing by one digit from that of $n \times m$ consecutive digits, means for connecting the output terminal of said second AND-gate to one input terminal of said adding circuit, means for connecting the output terminal of said delay element to the other input terminal of said adding circuit, and means for connecting the output terminal of said adding circuit to the input terminal of said delay element, whereby signals representing $n$ partial products are stored sequentially in the circulating loop comprising said delay element and said adding circuit, said sequence of $n$ stored partial products being the same as the sequence of the $n$ corresponding multiplicands stored in said first register.

2. A computer as in claim 1 further including a fourth circulating register adapted to delay the signals stored therein by a time corresponding to that of $n \times m$ consecutive digits, and means connecting the output terminal of said delay element to an input terminal of said fourth register and responsive to said control signal for transferring signals representing the product of each multiplication into said fourth register as said product is completed.

3. A computer as in claim 1 wherein said third register is adapted to delay the signals stored therein by one digit more than that of $n \times m$ consecutive digits and wherein said delay element is adapted to delay signals by one digit less than that of $n \times m$ consecutive digits.

4. A binary digital computer for multiplying each of $n$ binary digital multiplicands by a corresponding one of $n$ binary digital multipliers, comprising first and second circulating registers each adapted to delay the signals stored therein by a time corresponding to that of $n \times m$ consecutive digits, means for storing in said first register signals representing in sequence said $n$ multiplicands, wherein corresponding order digits of successive multiplicands are spaced in said first register by a time interval corresponding to $m$ digits, means for storing in said second register signals representing in sequence said $n$ multipliers, wherein corresponding order digits of successive multipliers are spaced in said second register by a time interval corresponding to $m$ digits, and wherein said sequence of $n$ multipliers is the same as the sequence of the $n$ corresponding multiplicands stored in said first register, a third circulating register adapted to delay the signals stored therein by a time differing by one digit from that of $n \times m$ consecutive digits, first reading means having output means and also having input means coupled to said second and third registers, control means for applying a control signal to said third register at a time whereby said control signal arrives at said first reading means simultaneously with the arrival thereat of a signal representing an extreme order digit of the $i$th multiplier in said second register, wherein said control signal continues to circulate in said third register and to arrive periodically at said first reading means simultaneously with digits of succeeding orders of said $i$th multiplier, second reading means having input means and output means, means for connecting the input means of said second reading means to said first register, means including delay means coupled between the output means of said first reading means and the input means of said second reading means for applying a signal to said second reading means coincident with the first arrival of the first digit signal of the $i$th multiplicand at said second reading means following the simultaneous arrival of signals representing unit digits of said $i$th multiplier and said control signal at said first reading means, a binary digital adding circuit having a pair of input terminals and an output terminal, said adding circuit being adapted to provide an output signal representing the sum of a pair of binary digital numbers in serial form applied as a pair of input signals to the respective input terminals of said adding circuit, a delay element having an input and an output terminal and a delay time differing by one digit from that of $n \times m$ consecutive digits, means for connecting the output means of said second reading means to one input terminal of said adding circuit, means for connecting said delay element between the output terminal of said adding circuit to the other input terminal of the adding circuit, whereby signals representing $n$ partial products are stored sequentially in the circulating loop comprising said delay element and said adding circuit, said sequence of $n$ stored partial products being the same as the sequence of the $n$ corresponding multiplicands stored in said first register.

5. A computer as in claim 4 wherein said third register is adapted to delay the signals stored therein by one digit more than that of $n \times m$ consecutive digits and wherein said delay element is adapted to delay signals by one digit less than that of $n \times m$ consecutive digits.

6. Apparatus for performing a computation on each set of a plurality of sets of numbers wherein each computation includes a plurality of successive operations and each of said sets includes first and second digital numbers, said apparatus comprising a first storage means adapted to store a repeating first group of signals, each first group representing in a predetermined sequence said first digital numbers, a second storage means adapted to store a repeating second group of signals, each second group representing in said predetermined sequence said second digital numbers, computing means coupled to said first and second storage means and adapted to read in said predetermined sequence said corresponding first and second digital numbers represented by the signal groups stored in said first and second storage means, said computing means being further adapted in response to each reading to perform a respective one of said successive operations and to produce a discrete output signal representing the result of said respective one of said operations, and third storage means connected to said computing means for separately storing the discrete output signals which result from operations in the computation on the same set of numbers.

7. Apparatus as defined in claim 6 wherein each said computation is multiplication, each multiplication including a plurality of successive additions, and wherein said computing means is adapted to perform said successive additions.

8. Apparatus for performing a computation on each set of a plurality of sets of numbers wherein each computation includes a plurality of successive operations and each of said sets includes first and second digital numbers, said apparatus comprising a first storage means adapted to store a repeating first group of signals, each first group representing in a predetermined sequence said first digital numbers, a second storage means adapted to store a repeating second group of signals, each second group representing in said predetermined sequence said second digital numbers, computing means coupled to said first and second storage means and adapted to read in said predetermined sequence said corresponding first and second digital numbers represented by the signal groups stored in said first and second storage means, said computing means being further adapted in response to each reading to perform a respective one of said successive operations and to produce a discrete output signal representing the result of said respective one of said operations, and means connected to said computing means for algebraically combining in respective signal groups the output signals which result from operations in the computation on the same set of numbers.

9. Apparatus for performing multiplication on each set of a plurality of sets of numbers wherein each multiplication includes a plurality of successive additions and each of said sets includes first and second digital numbers, said apparatus comprising a first storage means adapted to store a repeating first group of signals, each first group representing in a predetermined sequence said first digital numbers, a second storage means adapted to store a repeating second group of signals, each second group representing in said predetermined sequence said second digital numbers, computing means coupled to said first and second storage means and adapted to read in said predetermined sequence said corresponding first and second digital numbers represented by the signal groups stored in said first and second storage means, said computing means being further adapted in response to each reading to perform a respective one of said successive additions of said multiplication and to produce a discrete output signal representing the result of said respective one of said additions, and means connected to said computing means for additively combining in respective signal groups the output signals which result from additions in the computation on the same set of numbers.

References Cited in the file of this patent

UNITED STATES PATENTS

| | | |
|---|---|---|
| 2,749,037 | Stibitz | June 5, 1956 |
| 2,758,787 | Felker | Aug. 14, 1956 |
| 2,789,760 | Rey | Apr. 23, 1957 |
| 2,867,380 | Piel et al. | Jan. 6, 1959 |

OTHER REFERENCES

Harvard Staff—Annals of the Computation Lab. of Harvard University, vol. XXVII (1951); p. 201, Fig. 13.7 relied on.